(12) United States Patent
Gallou et al.

(10) Patent No.: US 9,191,702 B2
(45) Date of Patent: Nov. 17, 2015

(54) DATA REQUESTING AND TRANSMITTING DEVICES AND PROCESSES

(75) Inventors: Gilles Gallou, Acigne (FR); Angelo Mazzante, Thorigne Fouillard (FR); Henk Heijnen, Liffre (FR)

(73) Assignee: THOMSON LICENSING, Boulogne-Billancourt (FR)

( * ) Notice: Subject to any disclaimer, the term of this patent is extended or adjusted under 35 U.S.C. 154(b) by 2287 days.

(21) Appl. No.: 10/553,665

(22) PCT Filed: Apr. 19, 2004

(86) PCT No.: PCT/EP2004/050564
§ 371 (c)(1),
(2), (4) Date: Jul. 27, 2006

(87) PCT Pub. No.: WO2004/093451
PCT Pub. Date: Oct. 28, 2004

(65) Prior Publication Data
US 2006/0271982 A1    Nov. 30, 2006

(30) Foreign Application Priority Data

Apr. 17, 2003 (EP) .................................... 03290954

(51) Int. Cl.
| | |
|---|---|
| G06F 15/16 | (2006.01) |
| H04N 21/44 | (2011.01) |
| H04L 29/06 | (2006.01) |

(Continued)

(52) U.S. Cl.
CPC .... *H04N 21/44004* (2013.01); *H04L 29/06027* (2013.01); *H04L 47/10* (2013.01); *H04L 47/22* (2013.01); *H04L 47/2416* (2013.01); *H04L 47/266* (2013.01); *H04L 47/36* (2013.01); *H04L 65/4084* (2013.01); *H04L 65/607* (2013.01); *H04N 21/23406* (2013.01); *H04N 21/23805* (2013.01); *H04N 21/2401* (2013.01); *H04N 21/4424* (2013.01); *H04N 21/44209* (2013.01); *H04N 21/44245* (2013.01); *H04N 21/47211* (2013.01); *H04N 21/6118* (2013.01); *H04N 21/6377* (2013.01); *H04N 21/64322* (2013.01); *H04N 21/6582* (2013.01); *Y02B 60/31* (2013.01)

(58) Field of Classification Search
USPC ........................................................ 709/231
See application file for complete search history.

(56) References Cited

U.S. PATENT DOCUMENTS

| | | | |
|---|---|---|---|
| 5,648,824 A | 7/1997 | Dunn et al. | |
| 5,687,347 A | 11/1997 | Omura et al. | |

(Continued)

FOREIGN PATENT DOCUMENTS

| | | |
|---|---|---|
| EP | 698999 | 2/1996 |
| EP | 0701373 | 3/1996 |

(Continued)

OTHER PUBLICATIONS

Search Report Dated Oct. 6, 2004.

*Primary Examiner* — Joe Chacko
(74) *Attorney, Agent, or Firm* — Vincent E. Duffy; Joel M. Fogelson (57) ABSTRACT

The present invention concerns a data requesting device enabling flexible obtaining of data, notably AV (Audio/Video) data, with possibly limited required resources in terms of processing, memory and storing, included from a remote server through a WAN. The requesting device of the invention may notably allow to pause and retrieve a movie being played from such a server.

22 Claims, 5 Drawing Sheets

(51) Int. Cl.

| | | |
|---|---|---|
| *H04L 12/801* | (2013.01) | |
| *H04L 12/815* | (2013.01) | |
| *H04L 12/853* | (2013.01) | |
| *H04L 12/825* | (2013.01) | |
| *H04L 12/805* | (2013.01) | |
| *H04N 21/234* | (2011.01) | |
| *H04N 21/238* | (2011.01) | |
| *H04N 21/24* | (2011.01) | |
| *H04N 21/442* | (2011.01) | |
| *H04N 21/472* | (2011.01) | |
| *H04N 21/61* | (2011.01) | |
| *H04N 21/6377* | (2011.01) | |
| *H04N 21/643* | (2011.01) | |
| *H04N 21/658* | (2011.01) | |

(56) References Cited

U.S. PATENT DOCUMENTS

| | | | |
|---|---|---|---|
| 5,808,607 A | 9/1998 | Brady et al. | |
| 5,822,524 A | 10/1998 | Chen et al. | |
| 5,831,662 A | 11/1998 | Payton | |
| 5,870,134 A * | 2/1999 | Laubach et al. | 725/123 |
| 5,926,649 A | 7/1999 | Ma et al. | |
| 5,995,486 A * | 11/1999 | Iliadis | 370/229 |
| 6,029,200 A | 2/2000 | Beckerman et al. | |
| 6,167,496 A | 12/2000 | Fechner | |
| 6,212,571 B1 | 4/2001 | Kikuchi et al. | |
| 7,016,970 B2 * | 3/2006 | Harumoto et al. | 709/233 |
| 2001/0017708 A1 | 8/2001 | Kobayashi et al. | |
| 2001/0039587 A1 * | 11/2001 | Uhler et al. | 709/229 |
| 2002/0004840 A1 * | 1/2002 | Harumoto et al. | 709/231 |
| 2002/0007418 A1 * | 1/2002 | Hegde et al. | 709/231 |
| 2002/0107969 A1 | 8/2002 | Waldvogel et al. | |
| 2003/0037100 A1 | 2/2003 | Olejar et al. | |
| 2003/0037160 A1 * | 2/2003 | Wall et al. | 709/233 |
| 2003/0093488 A1 * | 5/2003 | Yoshida et al. | 709/213 |
| 2003/0236885 A1 * | 12/2003 | Takeuchi et al. | 709/225 |
| 2004/0168052 A1 * | 8/2004 | Clisham et al. | 713/153 |

FOREIGN PATENT DOCUMENTS

| | | |
|---|---|---|
| EP | 707272 | 4/1996 |
| EP | 748121 | 12/1996 |
| EP | 748123 | 12/1996 |
| EP | 787406 | 2/1997 |
| EP | 1182845 | 2/2002 |
| JP | 9185570 | 7/1997 |
| JP | 10171699 | 6/1998 |
| JP | 2000322874 | 11/2000 |
| JP | 2001094598 | 4/2001 |
| JP | 2002-215516 | 8/2002 |
| JP | 2003029996 | 1/2003 |
| WO | 9610315 | 4/1996 |
| WO | 9737476 | 1/1997 |
| WO | 0068835 | 11/2000 |
| WO | 0248890 | 6/2002 |
| WO | 0271191 | 9/2002 |
| WO | 03026232 | 3/2003 |

* cited by examiner

DATA REQUESTING AND TRANSMITTING DEVICES AND PROCESSES

The present invention relates, among other things and without restriction, to data requesting and transmitting devices and processes, notably for VOD (for "Video On Demand"), as well as to corresponding products.

According to existing techniques available for PCs (for "Personal Computers"), it is possible to order video and/or audio data (hereinafter noted "AV data") from a server through the Internet, by connecting a requesting PC to the server and giving thereto the IP (for "Internet Protocol") address of the PC. This is applied for example to trailers or advertisements. Those techniques, which rely on streaming, enable not only to download AV data in storing spaces for later displaying, but also to get the AV data at the same time as they are displayed.

However, such achievements require correspondingly high local resources at the PCs, in terms of CPU (for "Central Processing Unit") processing and of memory, to store and exploit suitably the received data. Otherwise, risks are relatively high of having problems at the receiving side, like for example overflow or data loss.

It is also known to obtain AV data from a server with a PC through a local network, by reading selected information stored in the server and transferring it in a buffer of the PC, and by playing the AV data accumulated in the buffer at the same time the data continue to be read, as soon as the buffer contains enough information (typically a few seconds).

Such a technique is only available for networks of limited sizes, and is notably not appropriate for WANs (for "Wide Area Networks"), since the correct playing of AV data by a PC requires regular and fast access to the server in which they are stored.

Document JP 2002-215516 discloses a downloading control method, in which parts of data are sequentially requested from a server by a terminal (like a portable telephone), for those data being streamed to the terminal and exploited therein. To avoid overflow, the terminal repeatedly requires transfer of partial data of a maximum size, based on remaining available size in a buffer memory used in the terminal. Also, requests are sent to the server when a remaining amount of data in the buffer decreases below a predetermined threshold.

Though that technique enables flexible adaptation of the server to the terminal, even using a small size buffer in the latter, it requires repeated operations for computing the available space and communicating it to the server. Also, the streaming rate adaptation at the server side may become heavy to execute when several terminals are simultaneously requiring data.

The present invention concerns a data requesting device enabling flexible obtaining of data, notably AV (Audio/Video) data, with possibly limited required resources in terms of processing, memory and storing, included from a remote server through a WAN. The requesting device of the invention may notably allow to pause and retrieve a movie being played from such a server.

The invention also concerns a data requesting process, data transmitting device and process, and products, corresponding to that requesting device and able to offer similar advantages.

To that effect, the invention is related to a data requesting device as defined in claim 1.

Surprisingly, the invention relies on an adaptation of the server streaming to the resources of the receiver, but without requiring repeated operations and communications from the receiver to the server during the streaming. By contrast, a mere initial negotiation between both may be enough.

Also, the invention appears to make possible sensibly improved shared pass band between simultaneous transmissions from a server to several receivers. This is due to the fact that for a given data transmission to a receiver, between the sending of two consecutive data portions, the server is free to work on other tasks.

The first and second communication networks used with the data requesting device may consist in a single bi-directional communication network. In various embodiments, they consist in WAN networks like for example the Internet, or in LAN networks (for "Local Area Network") such as for example home networks or networks used locally for Companies or for restricted geographic areas (e.g. for a building). Also, the first communication networks may comprise a broadcasting network for streaming the requested data and a bi-directional network (for example telephone link) to transmit control information.

The data requesting device is preferably compliant with any of dependent claims 2 to 6.

Notably, in embodiments involving pause control signals, the production of the latter at the data requesting device may in particular be triggered intentionally by a user via a user interface, or triggered automatically so as to avoid overflow in a central memory.

Also, the resuming of the data streaming after pausing at the server side may in particular be automatic after a given duration (that may notably be transmitted by a user within a pause control signal, for example a five minutes pause), or triggered by the sending of a resume control signal from the data requesting device.

The invention also concerns a decoder comprising a data requesting device according to the invention, and a data requesting process as defined in claim 8.

The invention further relates to a data transmitting device as defined in claim 9, and preferably to one of the embodiments mentioned in any of claims 10 to 13, and to a data transmitting process as defined in claim 14.

A further object of the invention is a computer program product comprising program code instructions for executing the steps of the data requesting process or the data transmitting process according to the invention, when that program is executed on a computer. By "computer program product", it is meant a computer program support, which may consist not only in a storing space containing the program, such as a diskette or a cassette, but also in a signal, such as an electrical or optical signal.

The invention will be better understood and illustrated by means of the no limitative following examples of embodiments and of putting in practice, with reference to the appended figures on which.

Figure 2:
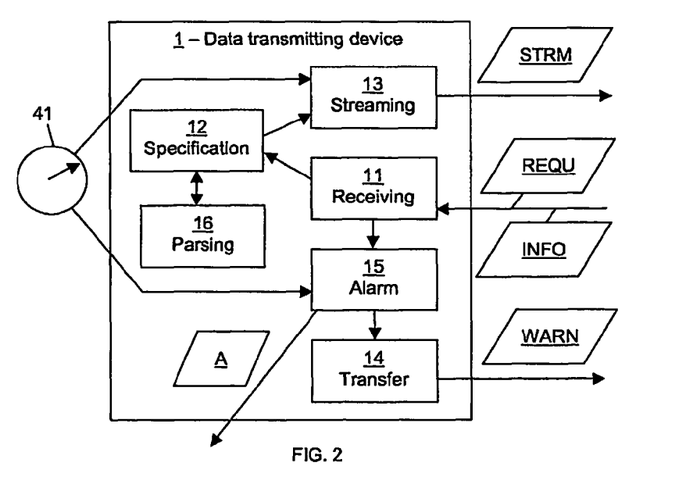
FIG. 2 is a block diagram of the data transmitting device of FIG. 1.
Figure 3:
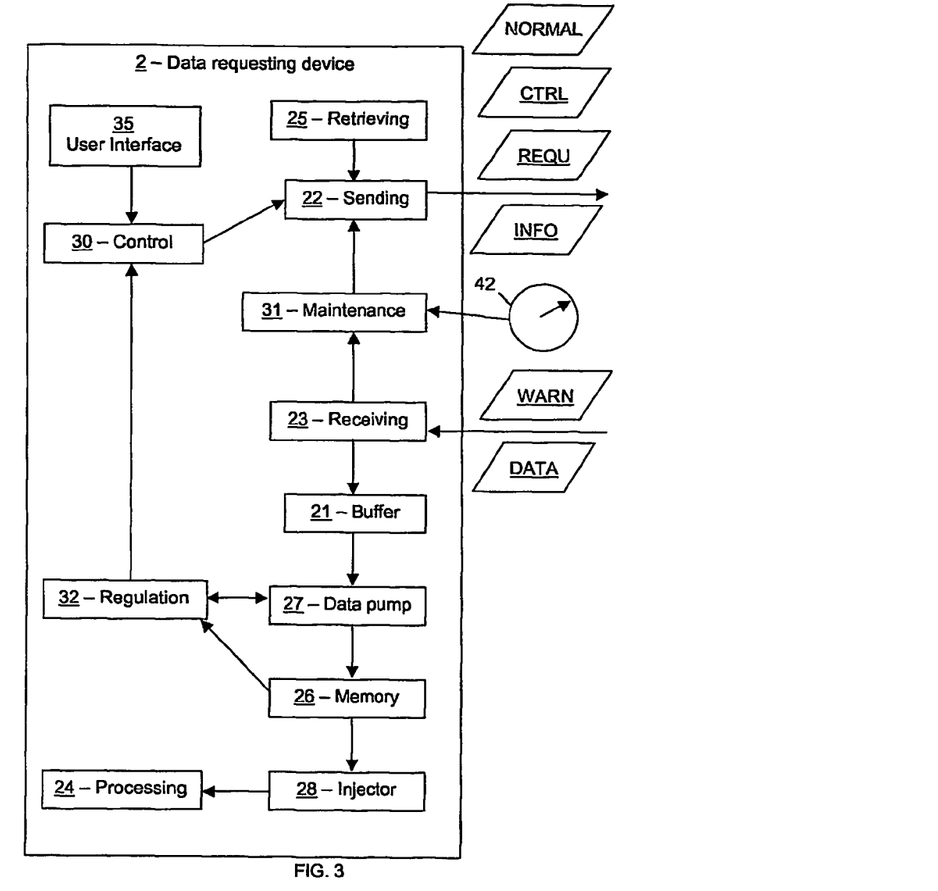
FIG. 3 is a block diagram of the data requesting device of FIG. 1.

In FIGS. 2 and 3, the represented blocks are purely functional entities, which do not necessarily correspond to physical separated entities. Namely, they could be developed in the form of software, or be implemented in one or several integrated circuits.

Figure 1:
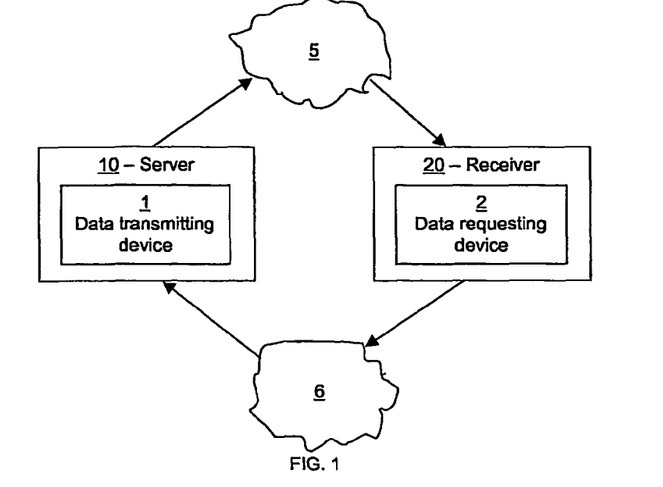
FIG. 1 shows a communication environment involving a server comprising a data transmitting device according to the invention, and a receiver comprising a data requesting device according to the invention.

A server 10 (FIG. 1) provided with a data transmitting device 1 is able to stream data to at least one receiver 20, provided with a data requesting device 2, through a first network 5. The receiver 20 is for its part able to transmit information to the server 10 via a return path through a second network 6. For example, the first network 5 is a broadcast network, which may rely notably on satellite, radio broadcasting, or cable, while the second network 6 is a telephone network. Both networks 5 and 6 may also be constituted by a unique bi-directional network, for example based on DSL communication (for "Digital Subscriber Loop").

The data transmitting device 1 of the server 10 (FIG. 2) comprises:

a receiving module 11, intended to receive messages from the receiver 20; such messages may include notably data requests REQU, information INFO on the capacities of the receiver 20, normal state signals NORMAL sent periodically to the server 10 to check correct functioning at the receiver side, and control signals CTRL for modifying the data streaming modalities (notably for pausing or resuming transmission, for ordering slow or fast motion or reverse motion);

a specification module 12, intended to determine a size of successive portions of data to be provided to the receiver 20 and a delay between two successive sending steps of those portions, in function of the information INFO; namely, the receiver 20 being able to support up to a maximum bandwidth rate and comprising an input buffer (or several input buffers), the information INFO relates to that maximum bandwidth rate and to the size of that input buffer (or the cumulated size of those input buffers);

a streaming module 13 for triggering the streaming of the requested data, in the form of the data portions, by means of a control signal STRM; the periodicity in the streaming of the portions is ensured by means of a clock 41;

a transfer module 14 for sending a warning message WARN to the receiver 20 when any of the normal state signals NORMAL is not received in due time;

an alarm module 15 for triggering an alarm state when the normal state signals NORMAL are not received in due time, even after a warning message WARN has been sent;

and a parsing module 16 used for fast motion and reverse motion interactively with the specification module 12, able to identify successive relevant places in the requested data for the wanted motion, the specification module 12 successively doing positioning at those places.

The data requesting device 2 of the receiver 20 comprises (FIG. 3):

a sending module 22 for transmitting to the server 10 the request messages REQU, information INFO, normal state signals NORMAL and control signals CTRL;

a receiving module 23, intended to receive notably the streamed data DATA from the server 10, and to transfer them to an input buffer 21 (or several such input buffers); the receiving module 23 is also provided for receiving notably from the server 10, the warning signals WARN;

a processing module 24 for processing the received data DATA, for example by decoding video and audio streams;

a retrieving module 25 able to retrieve the information INFO and to provide it to the sending module 22 for transmission to the server 10;

a central memory 26 intended to store temporarily the data DATA transferred from the input buffer 21, before their transmission to the processing module 24;

a data pump 27 intended to extract data available in the input buffer 21 and to transfer them into the central memory 26;

an injector 28 intended to transfer the data from the central memory 26 to the processing module 24 when the data in the central memory 26 fill up to a predetermined middle threshold level of the central memory 26;

a control module 30 able to produce control signals CTRL and to provide them to the sending module 22 for transmission to the server 10;

a maintenance module 31 for generating the normal state signals NORMAL and for triggering their periodic transmission to the server 10 by means of the sending module 22; the periodicity in the sending of the normal state signals NORMAL is ensured by means of a clock 42;

a regulation module 32 coupled with the data pump 27, intended to trigger the control module 30 to produce a pause control signal when the data in the central memory 26 exceed a predetermined high threshold level, and to produce a resume control signal when the data streaming has been previously paused by the regulation module 32 and the data decrease to a predetermined low threshold;

and a user interface 35, enabling a user to trigger the control module 30 and the sending module 22, so as to cause the control signals CTRL to be provided to the server 10.

A detailed specific embodiment, with reference to FIGS. 4 to 9, will enable to better understand the functioning of the data transmitting device 1 and data requesting device 2 described above.

A communication environment (FIG. 4) comprising the server 10 and IRDs (IRD1 . . . IRDn) respectively noted 20-1 . . . 20-n (each of them being similar to the receiver 20 above, the reference "20" being used below as a generic notation) communicate through PSTN wires (for "Public Switch Telephone Network") which constitute both networks 5 and 6 (same networks) as a PSTN network 7. That environment provides a real video streaming system fitting on the Internet world. The server 10 is connected to a first VDSL modem (for "Very high speed Digital Subscriber Loop") 43 by means of an Ethernet link, while the IRDs are for instance respectively associated with TV sets and are connected to a second VDSL modem 44 via a switch 45, through an Ethernet link.

Figure 4:
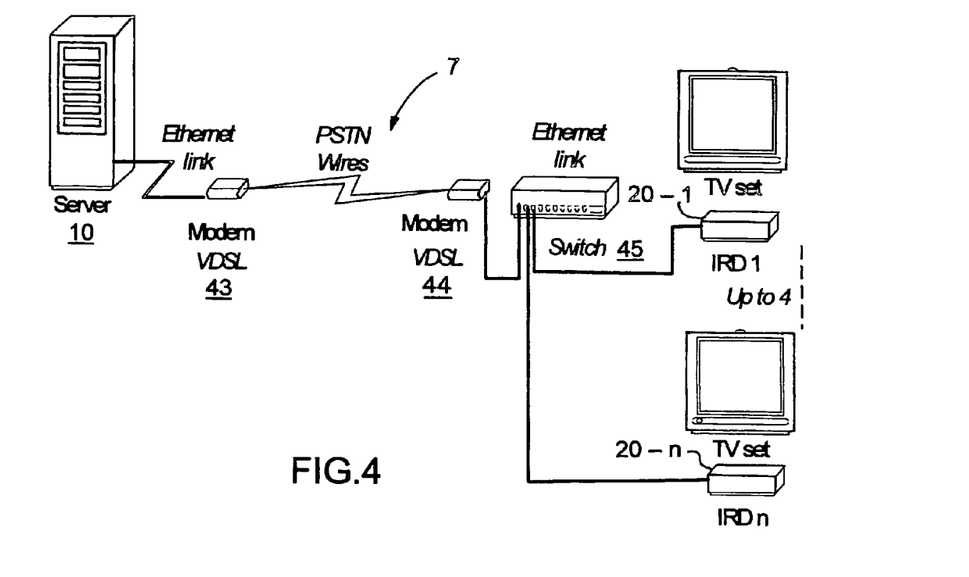
FIG. 4 shows a special embodiment of the communication environment of FIG. 1, in which the requesting devices are incorporated in IRDs (for "Integrated Receivers Decoders") and the transmitting device is incorporated in a PC server.

The VDSL modems 43 and 44 enable a high bit rate, up to 60 Mbit/s. Thus, the described communication environment offers a real Video-On-Demand system, where end-users may choose their dedicated programs from a catalogue, and ask for playing and pausing them, without useless bandwidth usage.

As an example, the described communication environment comprises set-top-boxes (hereinafter "STBs") 20-1 to 20-n with LAN connectivity (for "Local Area Network") constituting the IRDs, VDSL modems 43 and 44, and a PC server 10 based on the Linux technology. Of course, an operating system other than Linux could be used.

Each of the IRDs comprises a requesting device 2, while the server 10 comprises an associated transmitting device 1.

In variants:
ADSL (for "Asymmetric Digital Subscriber Loop") modem technologies and multicasting are used instead of the present VDSL modem embodiments, 'x'DSL in general providing other possibilities (HDSL—for "High-data-rate DSL", 10MDSL—for "10 Mbits/s DSL", ADSL2 . . . );
USB (for "Universal Serial Buses") connectors instead of Ethernet links at the users side (other connection means, e.g. directly on the bus are also possible);
and/or only one IRD is present at the user side, which is directly connected to the second VDSL modem 44.

A/ System Description: Specificities

The main requirement is to serve on request a video/audio stream to a user. The limit is fixed to up to 5 simultaneous streams according to the present embodiment in other embodiments, there may be a different limit, or no limit at all.

The end-users of the TV sets have notably the capability to choose one program from a catalogue, play it, stop it and pause/resume it.

A1/ Network

The VDSL modems 43 and 44, as the ADSL ones, use the actual user local telephone line. They have Ethernet or USB (for "Universal Serial Buses") connectors.

The transport format is an MPEG2 (for "Moving Picture Experts Group") SPTS (for "Simple Program Transport Stream"), several audio information sets being possibly transported for language purpose. In this way, the STBs have naturally the capability to play this type of stream easily.

At the server side, the PC 10 is connected through an Ethernet 100BT link (for "100Base-T") to the modem 43.

At the user side, the STBs (up to four) are connected through an Ethernet 10BT link to the switch 45, which is a 100BT/10BT switch. Any of the users may then share its VDSL line for different usages, like a home PC, other room STBs, and so on. Also, by using the switch, the collision spaces are split, thus no collision propagation may occur.

In the illustrated example, a specific protocol above UDP (for "User Datagram Protocol") protocol stack is used. Advantages of that solution (insofar as the links are fair enough), rely on the bandwidth delay introduced by the modem and on the current availability of STBs for which the Ethernet interface has only half-duplex capabilities; then, there is no need of a more complicated and less efficient protocol. Namely, experimentation shows that TCP (for "Transmission Control Protocol") protocol stack has real limitation with this network environment, even using the so-called "Window Scale Option".

A2/ Server 10

Based on Linux, it:
Includes a DHCP server (for "Dynamic Host Configuration Protocol") intended to setup the end-users IP (for "Internet Protocol") addresses;
runs the application as a daemon;
gives access to a catalogue of programs, each program being a file based on the server hard disk drive;
streams the file based on the developed protocol;
manages the user connection/disconnection states, as well as user dead state; a known port is used.

The server 10 is advantageously in a central office, just linked to DSLAM (for "Digital Subscriber Line Access Multiplexer"). Its catalogue is then managed by operators in an efficient way (refresh method, cache algorithms . . . ).

A3/ Set-Top-Boxes 20-1 . . . 20-*n*

They are able to:
choose one program from a list;
start that program by pressing a "Run program" button;
pause/resume the program by pressing a "Pause/resume program" button;
zap to another program;
decode correctly and synchronize audio and video,
accept intrinsic video bit rate from flow server up to 5 Mbits/s.

B/ The Protocol

B1/ Specificities

The server 10 and STBs 20-1 . . . 20-*n* are connected each other on TCP/IP LAN. In practice (FIG. 5), one of the STBs 20 connects socket to server 10 and requests an audio/video file. The server 10 then puts that file from a hard disk driver 17 through a buffer socket 18 in a loop process only ended by a later STB request.

Figure 5:
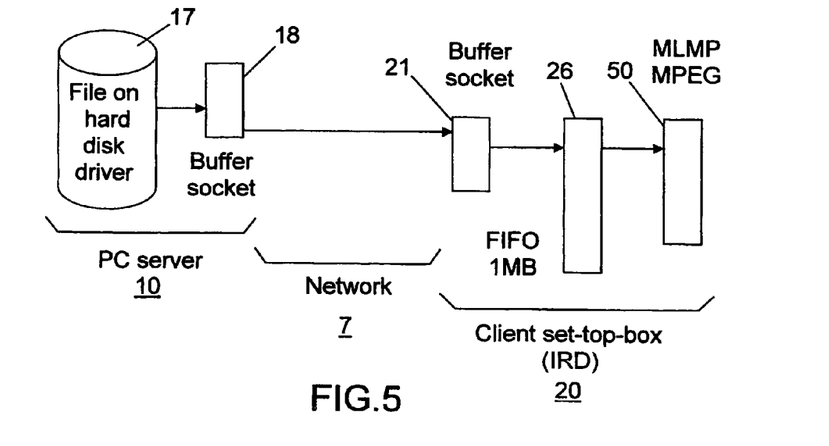
FIG. 5 represents pipes and buffers involved in streaming in the communication environment of FIG. 4.
Figure 6:
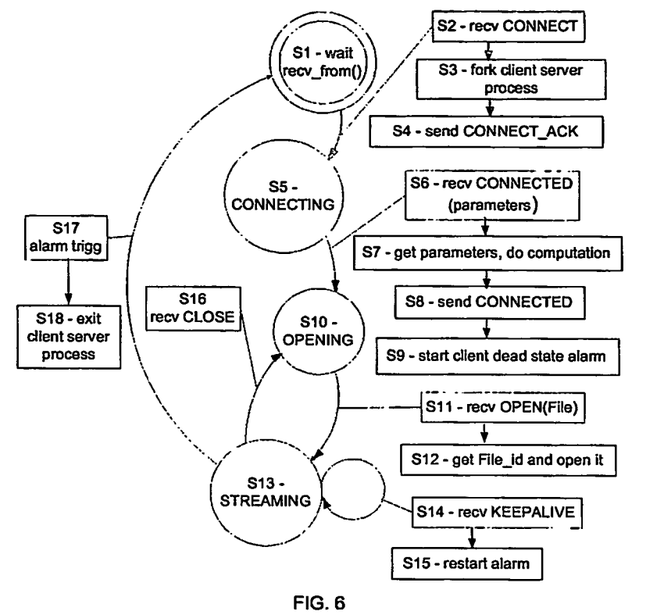
FIG. 6 is a protocol state transition diagram in the communication environment of FIG. 4, from server side.

The file is transmitted via the network 7 to the socket buffer 21 of the STB 20. From there, it is transferred to the central memory 26 constituted here by a FIFO (for "First In, First Out") having for example a size of 1 Mbyte, and then to an MPEG MLMP buffer 50 (for "Main Level Main Profile").

File transfer protocol, specifically designed, allows:
query for available catalogue;
connecting for stream transfer parameters setup;
opening/closing a file;
streaming an MPEG2-SPTS file, taking into account client data consumption;
possibly indexing the file;
checking for a client dead state.

The protocol is built to:
transfer streamed data, thus no data recovery is needed;
work on a fair network, i.e. without data loss, which is the case in the present system since no collision occurs because of the used modems and switch;
work with long fat pipes, i.e. a lot of data stored either in the network, or in client buffers.

This makes UDP quite appropriate as lower protocol.

The system may be seen as if a client (namely at one of the IRDs) requests data from a storage medium, which here is in a network. Thus, the client regulates the data streaming, according to the MPEG decoding processes.

Server Computations

The protocol being based on UDP, and the server 10 having big bandwidth capacity, the server has to take care not to overflow the client. Parameters are given by the client at a setup time to ensure this. These parameters are:

client max supported bandwidth rate: CBW; that rate involves capacities of the receiving STB 20 as a whole, and is notably linked to the rate of extracting the received data from an input socket buffer (or possibly from several input socket buffers);

client input socket buffer size: CSOCKBUFSZ; in the case of several input socket buffers, between which the incoming data are shared, the parameter CSOCKBUFSZ is given by the cumulated size of those buffers;

and client keep alive message repeat period; such a message is intended to be periodically sent from the STB 20 to the server 10—for example every 5 seconds, so as to warn the latter that the STB 20 is correctly working and exploiting the streamed data; its missing is interpreted as a failure or a dead state of the STB.

The server 10 streams data according to these parameters. It computes a value "UNIT_SIZE", giving a size of the portions to be sequentially sent to the requesting STB, from the socket buffer size. In an advantageous example, that value is given by:

UNIT_SIZE=CSOCKBUFSZ/8.

The factor "8" enables to have portions of small sizes at the server side, which proves to fragment efficiently the streamed data. Namely, the probability of overflow at the receiving side becomes very low, and the high partitioning may improve share pass band with respect to other streams. Lower factor is however possible (up to 2 for example), as well as higher factor if the server enables it.

The server 10 loops sending data putting a ceiling corresponding to that value (looping "UNIT_SIZE" by "UNIT_SIZE"), and inserting a delay in order to not override the CBW bit rate. A period "PERIOD" for sending the successive data portions is defined as

PERIOD=UNIT_SIZE/CBW.

That period is typically much shorter than the keep alive sending period.

Client Computations

Two parameters are computed by the client in order to pause/resume data transmission without any hole in the needed bandwidth for streaming a file. These parameters are giving thresholds of a filling level in the central FIFO memory 26 of the STB 20, having a size "FIFO-SIZE", intended to temporally store the data coming from the input buffer 21, before their processing. On one hand, a low FIFO threshold "LFIFO" gives a downward limit for ordering resuming of data streaming when it has been paused, by means of a specific message thereto called "XON". On the other hand, a high FIFO threshold "HFIFO", gives an upward limit for pausing the data streaming from the server 10 when that threshold is exceeded in spite of data processing, by means of specific message thereto called "XOFF".

Both threshold values LFIFO and HFIFO are chosen so that:

LFIFO<=HFIFO

FIFO-SIZE−HFIFO>=CBW*RTT/2

LFIFO>=CBW*RTT/2 where "RTT" is the Round-Trip-Time, namely the delay between sending a packet and getting its acknowledgement (the size of the FIFO is big enough so that: FIFO-SIZE>CBW*RTT). This time is measured by the client at the setup time, and may be re-evaluated in a periodic basis. It is representative of the amount of data possibly remaining to be received in the network when communication from the server is interrupted.

Input Socket Buffers 21

These input buffers are embedded with UDP/IP stack. They are large enough to not overrun the STB 20. The server 10 computes its streaming portion according to the client socket buffer size.

Central FIFO 26

This central buffer 26 is used to deal with burst side-effects. The client starts decoding only when this FIFO has enough data, which is determined by means of a third FIFO threshold, which is a middle threshold "MFIFO" having a value comprised between low and high thresholds LFIFO and HFIFO. That threshold MFIFO for triggering processing of the data (transfer to processing unit is in an efficient embodiment equal to the low threshold LFIFO. As mentioned above, the client also pauses the server streaming when the FIFO is full (threshold HFIFO), and resumes the server streaming when the FIFO is low (threshold LFIFO).

The pausing and resuming above are respectively done by means of the XOFF and XON messages sent to the server 10 from the STB 20. The same signals may be used by the client to decide at any moment to pause the streaming and later to resume it.

Further, in the advantageous achievement described here, the keep alive messages continue to be sent regularly and checked by the server, even during a pause state.

In a first specific implementation, the thresholds are chosen with the following values:

LFIFO=MFIFO=¼FIFO-SIZE; HFIFO=¾FIFO-SIZE.

With FIFO-SIZE being worth 1 Mbytes, this gives:

LFIFO=MFIFO=250 kbytes, HFIFO=750 kbytes.

Now, in the case the data are received at the streaming rate of CBW=6 Mbits/s and the data processing rate is a decoding rate which corresponds to an encoding bit rate "EBR" equal to 4 Mbits/s, streaming periods ("XON") of 2 seconds alternate with pause periods ("XOFF") of 1 second. Indeed, the effective filling rate of the FIFO when streaming is on is (CBW-EBR) (here 2 Mbits/s), while the emptying rate when streaming is off is EBR (here 4 Mbits/s).

In a second specific implementation, the thresholds are chosen with following values:

LFIFO=MFIFO=CBW*RTT/2

HFIFO=FIFO-SIZE CBW*RTT/2

With FIFO-SIZE=1 Mbytes and RTT=100 msec, this gives:

LFIFO=MFIFO=39,321 bytes, HFIFO=960,679 bytes.

Now, in the case the streaming rate is CBW and is worth 6 Mbits/s and the processing rate is EBR equal to 4 Mbits/s, streaming periods of 7.4 s alternate with pause periods of 1.85 s.

MLMP MPEG Buffers 50

These buffers are provided for correctly decoding an MPEG2 PES (for "Packet Elementary Stream") stream. The STB embedded audio/video decoder stack is used. The Main-Level/Main-Profile is implemented.

Because there is no encoding process at server side, the PCRs (for "Program Clock References") are not managed, but the local VCXO (for "Voltage Control Crystal Oscillator") is set to 27 MHz. In any way, audio is synchronized on video using video and audio PTSs (for "Program Time Stamps"). The decoding processes is buffer-underflow tolerant, and does not reset or flush the MLMP buffers 50 on errors.

B2/Protocol Stack

The protocol and streaming state transition diagrams are respectively represented on FIG. 3 and FIG. 4, from server side.

Protocol stack used is as follows:

| Layer | Protocol |
| --- | --- |
| 5/7 (application) | Application specific socket |
| 4 (transport) | UDP |
| 3 (network) | IP |
| 2 (link) | Ethernet |
| 1 (physical) | Ethernet 802.3 |

Socket is open over UDP protocol.

B3/Application Protocol

Process is cut in the following steps:

create socket;

application layer process comprising:
- intialize exchange: "Open Stream",
- exchange: "Write/read Stream",
- end exchange: "Close Stream";

and close socket.

Packets built in application layer are messages. All messages have a generic format
- header
  - message type (1 long),
  - up to four optional parameters (4 longs);
- data: a piece of the stream or empty for signalization messages.

All data types are network aligned, that is big-endian (MSB, for "Most Significant Bit").

The main protocol operations from server side are as follows (FIG. 6, where "recv" stands for "receive"):
- wait for receiving message from one of the STBs (step S1);
- receive a connection message "CONNECT" from one of the STBs (step S2);
- fork client server process (step S3);
- send connection acknowledgement CONNECT_ACK (step S4);
- connect to the requesting STB (step S5) by receiving connection parameters from the STB (step S6), getting parameters and doing corresponding computation (step S7) and sending connection message (step S8);
- start client dead state alarm for checking that the requested STB remains correctly in relation with the server (step S9); this is checked through the periodic reception of keep alive messages "KEEPALIVE" having a predetermined sending period (for example 5 s);
- open the file targeted by the STB client (step S10), by receiving an opening message indicating the relevant file "OPEN(file)" (step S11), getting a corresponding file identifier File_id and opening it (step S12);
- stream the file to the requesting STB client (step S13), while periodically receiving keep alive message (step S14) and restarting alarm accordingly (step S15), up to the end of the file transmission;
- stopping the file transmission when receiving a closing message CLOSE (step S16);
- in case of an alarm triggering (step S17) due to no reception of the keep alive message in due time, exit client server process (step S18).

The streaming operations from the server side are as follows (FIG. 7):
- proceed with data file streaming (step S13) as long as keep alive messages are received (step S14) so that alarm is restarted (step S15) and as long as the file is not completely transmitted; the non reception of the keep alive messages in due time leads to alarm triggering (step S17), as seen above;
- when receiving special interruption messages "XOFF" (step S19), pausing the streaming (step S20), while continuing to check received keep alive messages (step S14) and consequently restarting alarm (step S15);
- when later receiving special resumption messages "XON" (step S21), resuming the file transmission (step S13) at the point it was previously interrupted;
- whether the streaming is currently done or is paused, exiting the client server process in case the keep alive message is not received in due time.

Figure 7:
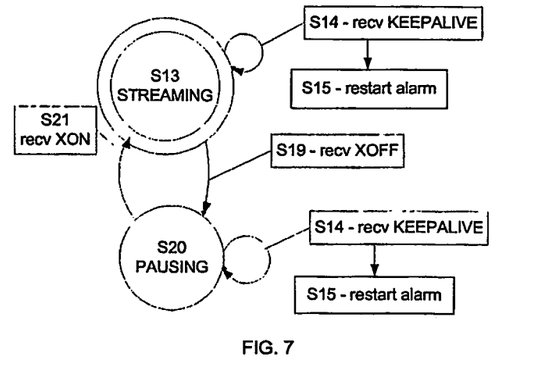
FIG. 7 is a streaming state transition diagram in the communication environment of FIG. 4, from server side.

Thanks to that process, the server 10 is able to be quite adapted to the receivers 20 specificities for the video streaming. Further, that process may possible to use only the bandwidth that is effectively necessary for the client to really exploit the streamed data.

In an advantageous embodiment, the time limit for triggering the alarm is given by the expected period time increased by a duration depending on the round-trip time RTT, for example three or four RTT.

In an improved version regarding the checking at the server side of correct reception of the streamed data at the client side, the alarm is only triggered in case no keep alive message is received for a duration sensibly longer than the keep alive period, for example during three time that period. This enables to take into account possible delays in the transmission between the STB and the server.

According to a further improvement in the checking method, once the expected time for receiving the keep alive message at the server side has passed and no such message has arrived, the server warns the client STB, which then immediately sends back again a keep alive message if still in an active reception state. This improves the reliability of the system, by considerably decreasing risks of erroneous interruptions of the streaming process due to transmission problems in the network, notably due to packet loss.

Both features above (determination of the critical time and warning messages) are advantageously combined.

a/ Connect Socket

| Server | STB |
|---|---|
| Socket | Socket |
| SetOption | SetOption |
| Bind | |
| RecvFrom (IN port = 1040, OUT ClientIpAddr) | |
| ← | SendTo (IN portDest = 1040, IN IpAddrDest) |
| Fork | |
| Socket | |
| SetOption | |
| Bind(IN port ephemeral, IN ClientIpAddr) | |

IP addresses are constants.

b/ Initialize Connection

| Server | STB |
|---|---|
| Read( . . . ) | ← Write(AL_CONNECT) |
| Write(AL_CONNECT_ACK) | → Read( . . . ) |
| | Compute RTT |
| Read( . . . ) | ← Write(AL_CONNECTED, CBW, CSOCKBUFSZ, KEEPALIVE repeat period) |
| AL_CONNECT = 0x03 (1 long) | Unused (4 longs) (4 longs) |
| AL_CONNECT_ACK = 0x04 (1 long) | Unused (4 longs) (4 longs) |
| AL_CONNECTED = 0x05 (1 long) | Client max bitrate (CBW) in Kbit/sec (1 long) Client buffer socket size (CSOCKBUFSZ) in bytes (1 long) Client keep alive message (KEEPALIVE) repeat period in msec (1 long) Unused (1 long) (4 longs) | c/ Open/Close a Stream

| Server | | STB |
|---|---|---|
| Read( . . . ) | ← | Write(AL_FILE_LIST) |
| Open file | | |
| Write(AL_FILE_LIS_ACK, DATA_PACKET_LEN) | → | Read( . . . ) |
| Write(AL_FILE_LIST _DATA, . . . ) | → | Read( . . . ) |
| Wrtie(AL_FILE_LIST _DATA, . . . ) | → | Read( . . . ) |
| . . . | → | . . . |
| Read( . . . ) | ← | Write(AL_OPEN, file_index) |
| Read( . . . ) | ← | Write(AL_CLOSE) |
| Close file | | |
| AL_FILE_OPEN = 0x01 (1 long) | | File index in the catalogue (1 long) Unused (3 longs)(4 longs) |
| AL_CLOSE = 0x02 (1 long) | | Unused (4 longs) (4 longs) |
| AL_FILE_LIST = 0x01 (1 long) | | Unused (4 longs) (4 longs) |
| AL_FILE_LIST_ACK = 0x04 (1 long) | | Number of AL_FILE_LIST_DATA packets following in the stream (1 long) Unused (3 longs) (4 longs) |
| AL_FILE_LIST_DATA = 0x04 (1 long) | | Catalogue description data, format to be defined (4 long) (4 longs) | d/ Streaming

| Server | | STB |
|---|---|---|
| Write(stream_data) | → | Read( . . . ) |
| Write(stream_data) | → | Read( . . . ) |
| . . . | . . . | . . . |
| Read( . . . ) | ← | Write(AL_KEEP_ALIVE) |
| Restart timer alarm | | |
| Write(AL_KEEP_ALIVE_ACK) | → | Read( . . . ) |
| Restart timer alarm | | Compute RTT |
| Write(stream_data) | → | Read( . . . ) |
| Write(stream_data) | → | Read( . . . ) |
| . . . | . . . | . . . |
| Read( . . . ) | ← | Write(AL_XOFF) |
| Pause streaming | | |
| Wait for XON | | |
| Read( . . . ) | ← | Write(AL_XON) |
| Resume streaming | | |
| Write(stream_data) | → | Read( . . . ) |
| Write(stream_data) | → | Read( . . . ) |
| . . . | . . . | . . . |
| AL_KEEP_ALIVE = 0x08 (1 long) | | Unused (4 longs) (4 longs) |
| AL_KEEP_ALIVE_ACK = 0x0B (1 long) | | Unused (4 longs) (4 longs) |
| AL_XOFF = 0x07 (1 long) | | Unused (4 longs) (4 longs) |
| AL_XON = 0x06 (1 long) | | Unused (4 longs) (4 longs) | e/ End Exchange and Close Sockets

| Server | | STB |
|---|---|---|
| Alarm triggers because of no keep alive message Close socket Exit process | . . . . . . | Exit, standby or crash |

C/ Set-Top-Boxes 20

Once one of the STBs 20 sends "AL_OPEN" message, it waits until the server 10 sends stream data packets (reception is non blocking). The STB 20 reads as much as possible data from the socket, and releases the CPU (for "Central Processing Unit") for injection and decoding processes to be scheduled. One suitable algorithm consists in reading half buffer socket size at each schedule of the data pump 27, the latter being part of the requesting device 2 incorporated in the STB 20.

With presently available STB designs, the maximum measured sustained bit rate is around 6 Mbit/s, which is high enough for good MPEG2 video and audio quality.

The data pump 27 gives directly to the input socket buffer 21 the "Write" pointer of the central FIFO 26 and the contiguously available space of that FIFO (this avoids intermediate copy from socket buffer to FIFO buffer).

The volume of data taken during each transfer from the central FIFO 26 for processing, given by a "LenAsked" value, is half FIFO size and avoids heavy scheduling works. After such a FIFO transfer is fulfilled, LenAsked is the contiguously available size according to consumer pointer. The injector 28 being part of the requesting device 2 is intended to manage it.

If the user zaps from one flow to another, the socket, the FIFO 26 and the bit buffers 21 may be flushed.

The server 10 does not anticipate the read file. The read length and sent length are constant and smaller than internal input socket buffer 21 (CSOCKBUFSZ) in order to avoid burst transfers: protocol also regulates transmit rate with respect to consumer rate (CBW parameter central FIFO 26 managed by data pump 27 on STB 20).

The IRD processing overview is explained below (see FIG. 8), the various described elements being parts of the IRD requesting device.

Figure 8:
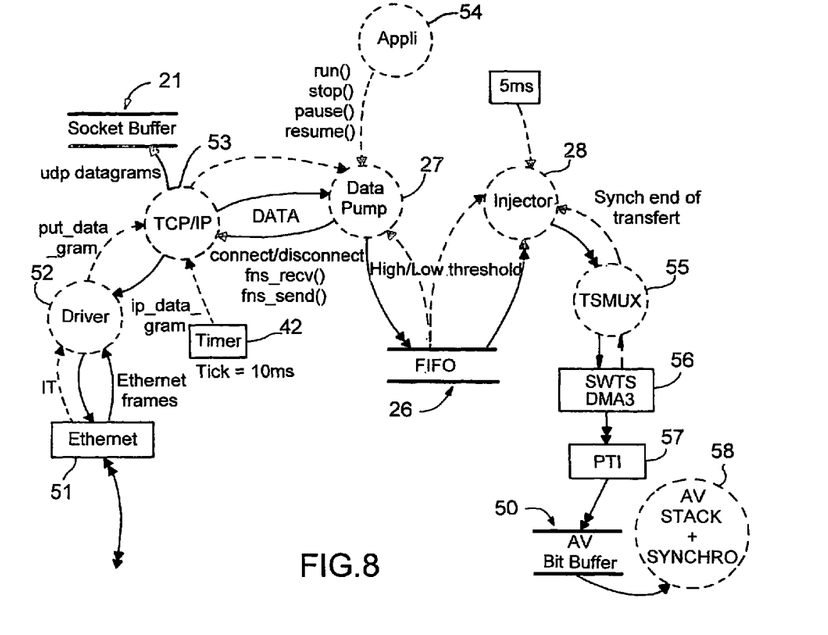
FIG. 8 represents a processing overview in the IRDs of FIG. 4.

Zapper ("Appli") 54: gets user input selection (program identifier), runs the data pump 27, injector 28 and starts AV decoders; if the user changes program, the zapper stops data pump 27 and injector 28 before running them again. The video decoder does not need to be stopped.

Ethernet driver 52: interfaces TCP/IP stack 53 to a physical Ethernet controller 51, which is for example the one commercialised as "CS8900A" by the Company Cirrus Logic. The rate is comprised between 3 Mbit's and 6 Mbit/s. So, if the rate is 4 Mbits, one frame (1460 bytes) is processed in 2.86 ms. Interruptions process ("IT") is provided for warning the driver 52 of control data transmission.

TCP/IP stack 53: TCP/UDP/IP stack 53 over Ethernet, with socket non-blocking API (for "Application Programming Interface"). A DHCP client (for "Dynamic Host Configuration Protocol") is embedded in order to get an IP address dynamically. The TCP/IP stack 53 makes use of the socket buffer 21, having 64 kbytes max, and of a timer 42.

Data Pump 27: uses a UDP port in order to get MPEG2-TS (for "Transport Stream") data from the server 10. In operation, the file identifier is specified by the user and transmitted directly to the server 10 during connection. Once connected to the server 10, the data pump 27 reads the available FIFO length and asks the server 10 to pause the data streaming (XOFF message) when the FIFO 26 is nearly full (HFIFO threshold), and to resume it when the FIFO 26 is nearly empty (LFIFO threshold). It allows also the user to zap thus to flush the FIFO 26. The flush method is then propagated to the injector 28.

Central FIFO 26: X Mbytes FIFO (for example 1 Mbyte), used to regulate the decoding process and the streaming process, and to deal with network bursts. A FIFO manager manages the three thresholds, the low one LFIFO and high one HFIFO respectively triggering and pausing the injector process, and the middle one MFIFO triggering the data pump process.

For transmissions, a unit size of 32 kbytes is for example chosen (with a unit size of 50 kbytes, a transmission takes 20 ms). Namely, considering a rate of 4 Mbits/s, it takes 2 seconds to fill the central FIFO 26, a full FIFO corresponding also to 2 seconds decoding.

Taking a chunk of 8 kbytes in the server file, it takes 16 msec to reach the client socket buffer. The same data are transferred into the FIFO 26 at an approximate rate of 2 to 4 kbytes/msec, depending on the CPU embedded in the STB. Thus, the STB transferring process is negligible.

The central FIFO 26 absorbs the possible jitter from the server 10 and the network. Preferably, the bandwidth rate CBW of the client is greater than the encoding rate EBR. In cases where the values of EBR and CBW are close, the FIFO 26 may be smaller.

Injector 28: The notion of flow control between the PC server 10 (producer) and the decoding process (consumer) is computed here: once started, the injector 28 polls a video bit buffer level and injects via a DMA (for "Direct Memory Access") to a TSMUX (meaning "Transport Stream Multiplexer") 55, using SWTS input (for "Software Transport Stream") 56, a given quantity of FIFO data. The central FIFO 26 must then have sufficient data.

TSMUX 55: based on registers 61 (FIG. 9) like those commercialised as "ST5516" by the Company ST Microelectronics, this interface permits injection of data from memory to a PTI (for "Programmable Transport Interface") 57 in SWTS mode (using configuration registers 63). It stores temporally data in its internal 32-byte SWTS FIFO 62 and streams them out to the PTI 57. Speed of byte transfer can be adjusted. The pace rate is worth for example 40 Mbits/s.

AV stack 58: audio and video decoding process; allows to setup the decoding processes, directed to the targeted PID (for "Packet IDentifier") for decoding. It enables to start the decoding processes, and to indicate video bit buffer level (noted "VBBL")—the bit buffers are underflow tolerant.

AV synchronisation: it is based on PTS values (for "Program Time Stamps") from Video and Audio. No PCR is managed so that the 27 MHz VCXO has a fixed command value. Video decoding process starts and initializes an STC value (for "System Time Clock") with the first Video PTS. Audio skips frame until its PTS value is near STC value.

C1/ Injector 28

Figure 9:
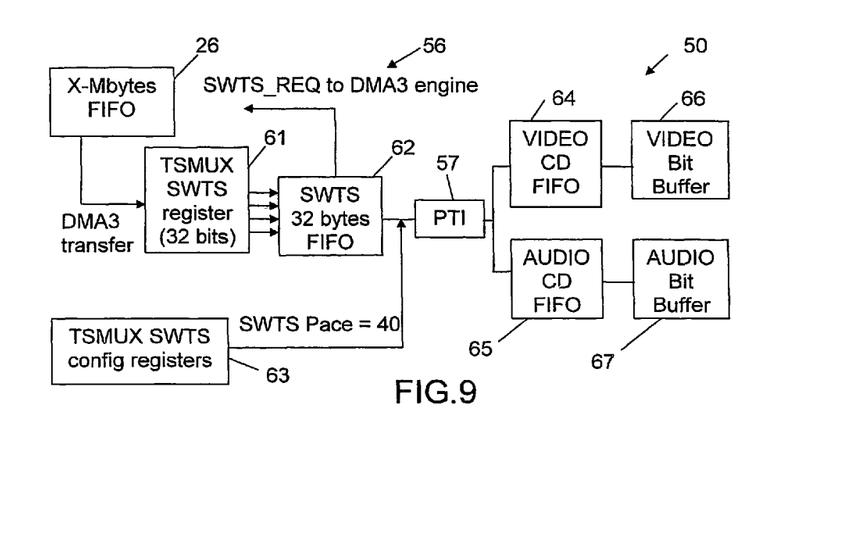
FIG. 9 illustrates functionalities of an injector in one of the IRDs of FIG. 4.

The injector 28 and its functions are now detailed (with reference to FIG. 9).

Injection of data to SWTS input 56 is paced using a "SWTS_REQ" signal that is routed through the PTI "DMA3" channel. That SWTS_REQ signal is asserted when the internal SWTS FIFO 62 has room for at least 16 bytes. Each time the SWTS_REQ is low and there is data to be read from the X-Mbytes FIFO 26, a programmable number of bytes is transferred to the SWTS input 56. At the end of the complete transfer, an interrupt is set to signal injector task that data have been transferred.

In case of the SWTS entry, the destination pointer is fixed in video and audio compressed data FIFO, respectively noted 64 and 65: that injection is processed like "CD_FIFO". A SWTS register address replaces CD_FIFO address and no increment is programmed directly by "PTI_DMA3SETUP" register (so: "DMA3BLOCKMOVE=0").

PTI 57 Version Driver

The PTI driver is able to provide software support for DMA injection. It runs in "PTI3" hardware used in "PTI1" backwards compatible mode. In the presented embodiment, the only restriction is that interrupt mode is not allowed for signalling DMA transfer end: the call to the "pti_data_dma_synchronize" function blocks until the end of the DMA transfer.

Interconnecting PTI DMA3 with TSMUX 55

The "SWTS_REQ" signal is multiplexed to the "PTI NOT_CDREQ3" signal by configuring "CONFIG_CONTROL_A" register (namely: "PTIA_CDREQ3_MUXSEL[3:0]=TSSUB_SWTS_REQ").

The injector task needs to know the level of occupation of Video and Audio bit buffers respectively noted 66 and 67, before injecting data in the PTI 57. Supposing that each stream contains a video and an audio component and audio bit buffer 67 capacity is sufficient to avoid overflow and underflow, monitoring only video bit buffer level may be acceptable.

To do this, a "VID_VBL" register is read, which gives the current level of Video bit buffer 66 in units of 2 kbits (256 bytes). The size of free space in this buffer is then immediately deduced. The injector task starts DMA transfer from user central FIFO 26 to the PTI 57 through the TSMUX 55, the size of transfer being:

min(RVBB,central FIFO available data)

where RVBB ("Remaining space in Video Bit Buffer") stands for the remaining free space in the VBB ("Video Bit Buffer") 66.

Thus, the transfer is computed taking into account only VBB 66. This implies that the ABB (for "Audio Bit Buffer") 67 is large enough to not overflow.

For a flow at 4 Mbits/s (500 kbytes/s), the transfer of 50 kbytes of data appends every 100 ms. According to SWTS pace rate fixed to 40 Mbits/s (5 Mbytes/s), the transfer duration takes at least 10 ms. So, the corresponding thread sleeps for 90 ms between each transfer.

C2/ Audio/Video Stack 58

Audio/Video Stack 58 has three main functions:
configure demultiplexing, start audio and video decoders;
manage synchronization between Audio and Video;
and regulate the data streaming, getting Video bit buffer level, and supply it for injector client.

It is not necessary to pause or freeze video, mute sound or display still picture.

The synchronization of Audio from Video decoders is made thanks to Audio PTS and Video PTS. The PCRs from flow are not managed, the VCXO is set to 27 MHz.

STC value is set with first Video PTS. The synchronisation algorithm already exists in audio driver. The only need is to modify a function in order to set STC value with Video PTS. This can be processed as follows.

Watching video PTS is not aborted in the case an error occurs in the stream (STC/video PTS distance is updated every time a PTS occurs).

The stack is also tolerant regarding bit-buffers underflow, i.e. neither decoding process reset, nor bit-buffer reset.

The bit-buffers (VBB 66 and ABB 67) are correctly sized for a PULL model, that is the decoder process regulates the data streaming. As concerns the VBB 66, it is sized for MLMP feature, around 356 Kbytes. To size the ABB 67, the ratio between the lowest video bit rate and the highest audio bit rate is computed. This ratio is applied as follows to size the ABB 67, with mVBR standing for the minimum video bit rate and MABR standing for the maximum audio bit rate:

ABB size=MABR/mVBR*(MLMP VBB size).

For example, mVBR and MABR are respectively worth 1 Mbits/s and 448 kbits/s.

As additional features, the clients may send to the server 10, control messages for slow or fast motion.

In a particular embodiment for slow motion, the period PERIOD for sending the data portions is made longer (the periodicity modification depending on the slowing level requested by the client), while the periodicity for the keep alive messages is kept unchanged.

In a particular variant embodiment for fast motion and reverse motion, the client is further able to send to the server 10 specific control messages "SEEK" for ordering a positioning in a data file to be streamed, which may be a number of bytes with respect to a beginning or an end of that file. The SEEK messages may then contain both a direction and an offset. The client then uses the SEEK messages between XOFF and XON messages, so as to master the playing speed as well as the quantities of chosen data, and to compensate for underflows in case of fast motion. The sequence of the sent orders if then: XOFF/SEEK(direction, offset)/XON/XOFF . . . .

Further, in that particular embodiment, the client is intended to send to the server 10 information on a chosen decoding algorithm for fast motion, for example to take only images of "I" type in GOPs (Groups of Pictures) for decoding.

The client is then in charge of steady playing, through appropriate determination of the positioning.

Also, like for slow motion, the periodicity for the keep alive messages is kept unchanged.

The invention claimed is:

1. A data requesting device, connected through at least one first communication network to at least one data server, wherein said data requesting device is able to support up to a maximum bandwidth rate, and said data requesting device comprising:
   a sending module for sending requests for audio/video data to the at least one data server via at least one second communication network;
   a receiving module for receiving streamed audio/video data from said at least one data server into an input buffer via said first communication network and for providing said streamed audio/video data to a processing module;
   a retriever module for retrieving information comprising at least information indicating said maximum bandwidth rate; and
   said sending module sends to said at least one data server via said second network said information, so that said at least one data server is able to determine at least one size of successive portions of said streamed audio/video data and at least one delay between two successive sending steps of said portions based on said maximum bandwidth rate supported by said data requesting device.

2. The data requesting device according to claim 1, wherein said data requesting device comprises a data pump to extract data available in said input buffer and to transfer said extracted data into a central memory for said extracted data to be used by said processing module, said data pump being able to produce a pause control signal when said extracted data in said central memory exceed a predetermined high threshold level of said central memory, and in that said sending module sends said pause control signal to said at least one data server.

3. The data requesting device according to claim 2, wherein said data pump is able to produce a resume control signal when the extracted data transferred from said input buffer to said central memory has been paused and said extracted data in said central memory decrease down to a predetermined low threshold level of said central memory, and in that said sending module sends said resume control signal to said at least one data server.

4. The data requesting device according to claim 2, wherein said data requesting device comprises an injector to transfer said extracted data from said central memory to said processing module only when said extracted data in said central memory fill up to a predetermined middle threshold level of said central memory.

5. The data requesting device according to claim 2, wherein said threshold level depends on a round-trip time between said data requesting device and said at least one data server.

6. The data requesting device according to claim 1, wherein said data requesting device is able to produce pause, resume and seek control signals for respectively pausing and resuming data streaming and for positioning at given appropriate places of said requested audio/video data, and said sending module sends to said at least one data server sequences of successively said pause, seek and resume control signals, so as to allow at least one feature among fast motion and reverse motion.

7. A decoder, comprising a data requesting device according to claim 1.

8. A data requesting method through at least one first communication network from at least one data server to a data requesting device wherein said data requesting device is able to support up to a maximum bandwidth rate and said data requesting method comprising:
   sending requests for audio/video data to the at least one data server via at least one second communication network,
   receiving streamed audio/video data from said at least one data server into said input buffer,
   sending information comprising at least information indicating said maximum bandwidth rate from said data requesting device to said at least one data server via said at least one second network, so that said at least one data server is able to determine at least one size of successive portions of said streamed audio/video data and at least one delay between two successive sending steps of said portions based on said maximum bandwidth rate supported by said data requesting device.

9. The data requesting method according to claim 8, further comprising extracting of data available in said input buffer and transferring said extracted data into a central memory for said extracted data to be used by said processing module, and producing a pause control signal when said extracted data in said central memory exceed a predetermined high threshold level of said central memory, and sending said pause control signal to said at least one data server.

10. The data requesting method according to claim 8, further comprising producing of pause, resume and seek control signals for respectively pausing and resuming data streaming and for positioning at given appropriate places of said requested audio/video data, and sending to said at least one data server sequences of successively said pause, seek and resume control signals, so as to allow at least one feature among fast motion and reverse motion.

11. The data requesting method according to claim 8, wherein said method is implemented by a decoder.

12. A data transmitting device, wherein said data transmitting device comprises:
   a receiving module for receiving requests for audio/video data from at least one data requesting device;

a specification module configured to determine at least one size of successive portions of said requested audio/video data to be provided to said at least one data requesting device; and a streaming module for triggering streaming of said portions to said at least one data requesting device;

said receiving module receiving from said at least one data requesting device information comprising at least information indicating capacities of said at least one data requesting device, and said specification module is configured to determine said at least one size as a function of said information;

said capacities comprising a maximum bandwidth rate being supported by said at least one data requesting device;

said specification module is configured to determine at least one delay between two successive sending steps of said portions as a function of said information;

and said streaming module periodically triggers streaming of said portions having said at least one size to said at least one data requesting device, with a period equal to said delay.

13. The data transmitting device according to claim 12, wherein said receiving module receives pause control messages from said at least one data requesting device, and said streaming module pauses said data streaming when one of said pause control messages is received.

14. The data transmitting device according to claim 12, wherein said receiving module receives slow motion messages from said at least one data requesting device, and said specification module determines at least one increased value of said period when said slow motion messages are received.

15. The data transmitting device according to claim 12, wherein said receiving module receives at least one kind of messages among fast motion and reverse motion messages from said at least one data requesting device, and said data transmitting device further comprising a parsing module able to identify successive relevant places in said requested audio/video data for at least one of said fast and reverse motions, said specification module successively positioning at said places, when one of said fast motion and reverse motion messages is received.

16. The data requesting method according to claim 9, further comprising producing a resume control signal when data transfer from said input buffer to said central memory has been paused and said extracted data in said central memory decrease down to a predetermined low threshold level of said central memory, and said sending module sending said resume control signal to said at least one data server.

17. The data requesting method according to claim 9, wherein said data requesting method further comprises transferring, by an injector, of said extracted data from said central memory to said processing module only when said extracted data in said central memory fill up to a predetermined middle threshold level of said central memory.

18. The data requesting method according to claim 9, wherein said threshold level depends on a round-trip time between said data requesting device and said at least one data server.

19. A data transmitting method comprising:
receiving requests for audio/video data from at least one data requesting device, as well as receiving information comprising at least information indicating capacities of said data requesting device, determining at least one size of successive portions of said requested audio/video data to be provided to said at least one data requesting device, as a function of said information, and streaming said portions to said at least one data requesting device, said capacities comprising a maximum bandwidth rate being supported by said at least one data requesting device;

said determining comprising determination of at least one delay between two successive sending steps of said portions as a function of said information, and said streaming including periodically streaming said portions having said at least one size to said at least one data requesting device, with a period equal to said delay.

20. The data transmitting method according to claim 19, comprising receiving pause control messages from said at least one data requesting device, and pausing said data streaming when one of said pause control messages is received.

21. The data transmitting method according to claim 19, wherein said method comprises receiving slow motion messages from said at least one data requesting device, and determining at least one increased value of said period when said slow motion messages are received.

22. The data transmitting method according to claim 19, comprising receiving at least one kind of message among fast motion and reverse motion messages from said at least one data requesting device, and identifying successive relevant places in said requested audio/video data for at least one of said fast and reverse motions, and successively positioning at said places, when one of said fast motion and reverse motion messages is received.

* * * * *